A. C. P. RUSSEN.
ATTACHMENT FOR MILLING OR GRINDING MACHINES.
APPLICATION FILED MAY 17, 1919.
1,407,485.
Patented Feb. 21, 1922.
3 SHEETS—SHEET 1.
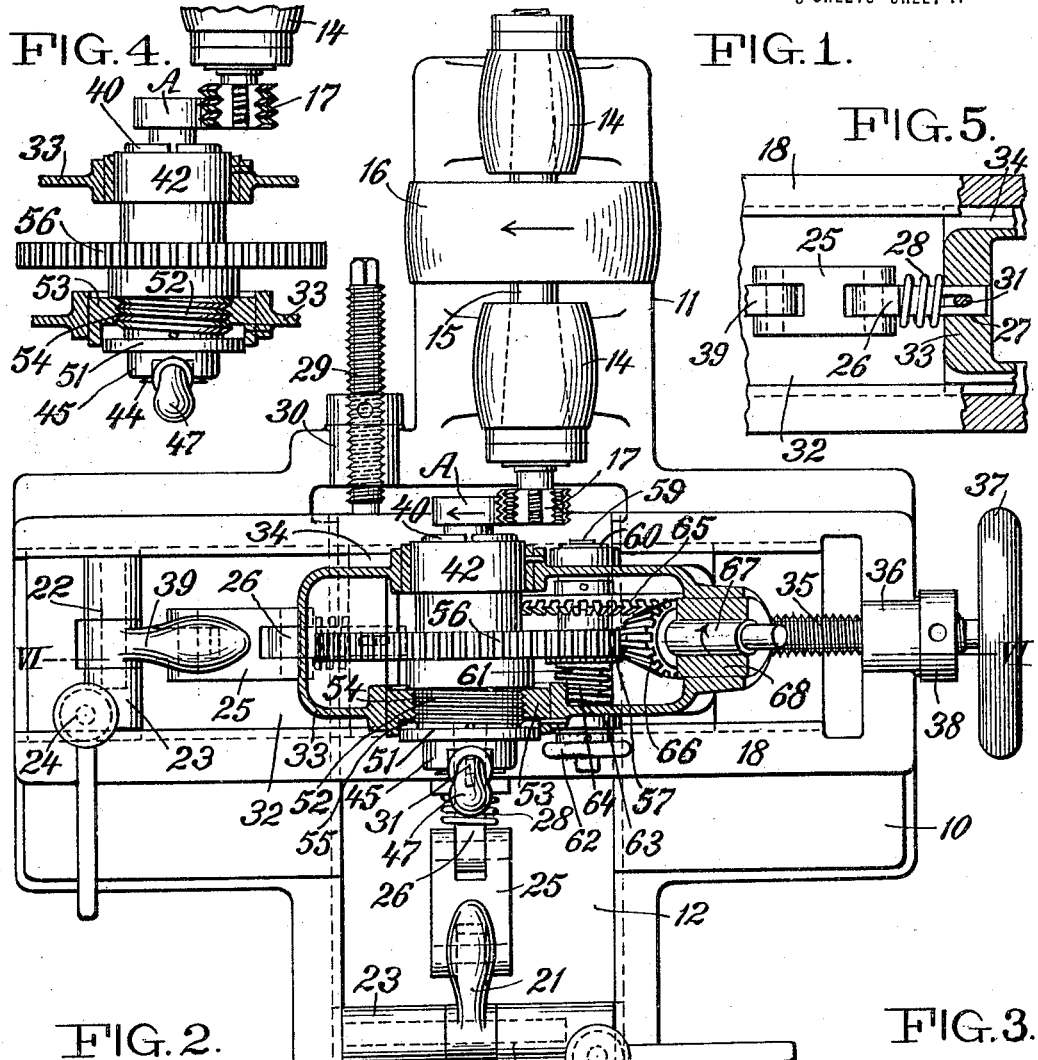
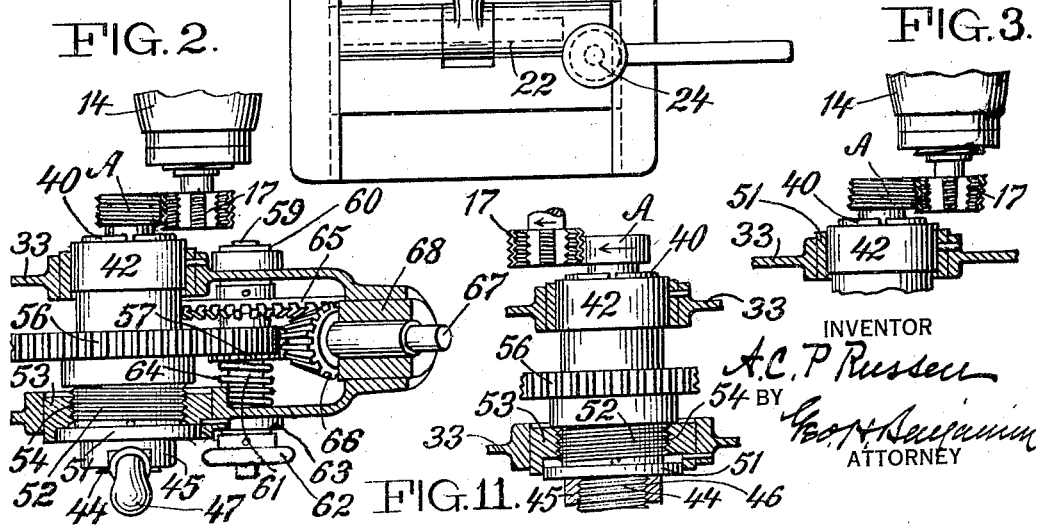
INVENTOR
A. C. P. Russen
BY
Geo. H. Benjamin
ATTORNEY

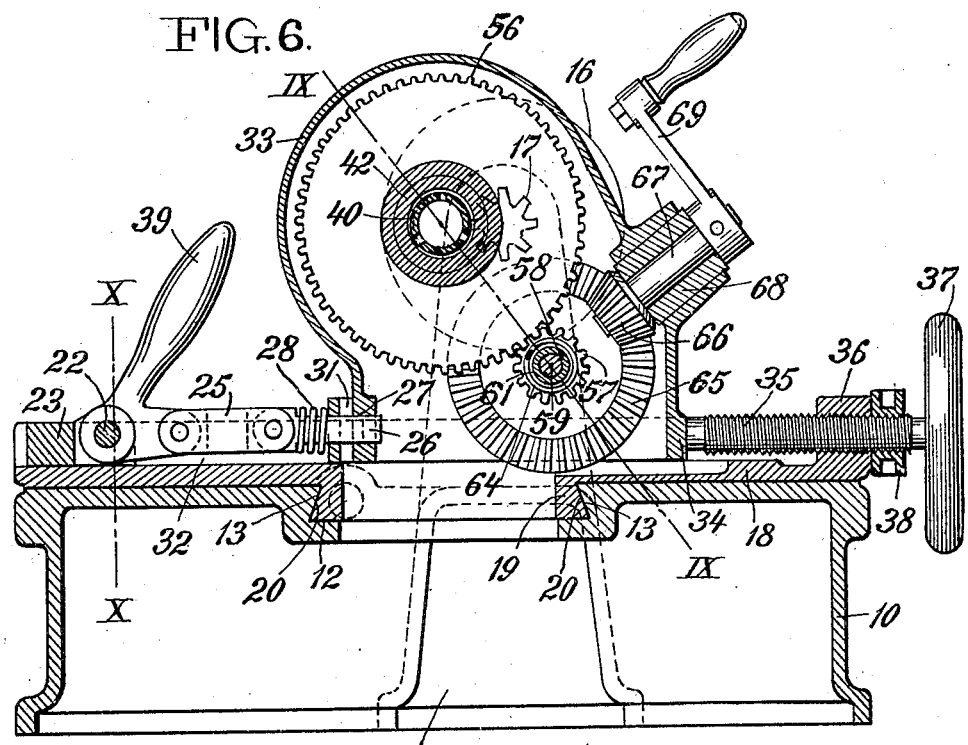

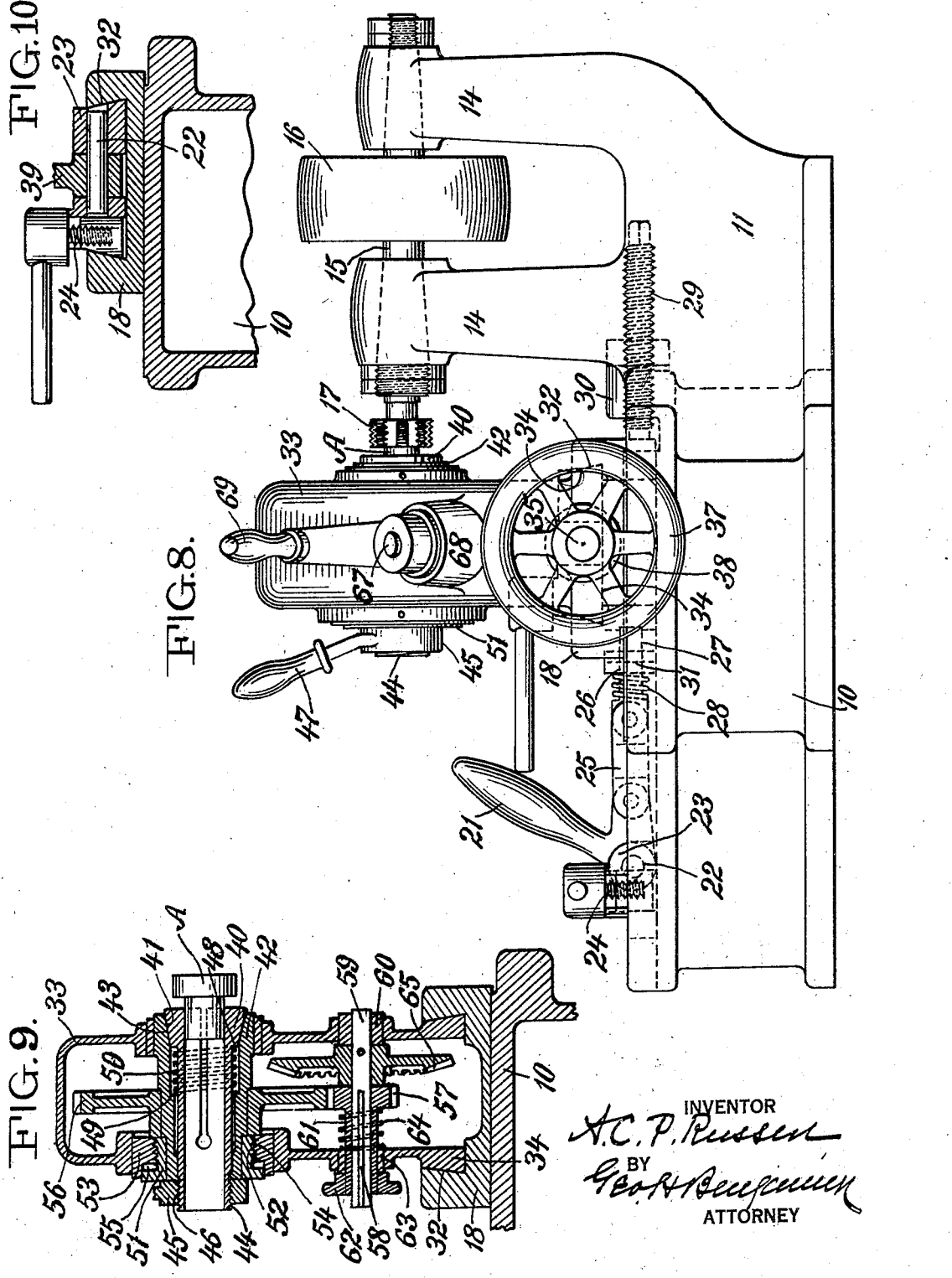

UNITED STATES PATENT OFFICE.

ANTHONY C. P. RUSSEN, OF NEWARK, NEW JERSEY.

ATTACHMENT FOR MILLING OR GRINDING MACHINES.

1,407,485.  Specification of Letters Patent.  Patented Feb. 21, 1922.

Application filed May 17, 1919. Serial No. 297,825.

*To all whom it may concern:*

Be it known that I, ANTHONY C. P. RUSSEN, a citizen of the United States, residing at Newark, county of Essex, State of New Jersey, have invented certain new and useful Improvements in Attachments for Milling or Grinding Machines, of which the following is a specification.

My invention consists in a device adapted to be used in connection with a milling or grinding machine, and which has for its purpose, when a milling machine is used, to accurately and rapidly cut screw threads, straight or inclined, on the exterior surface of a cylindrical body, or on the exterior or interior surface of a tubular body; and when a grinding machine is used, to grind the exterior surface of a cylindrical body, or the exterior or interior surface of a tubular body. Further, a device by reason of which the article to be acted upon may be rapidly adjusted as regards the screw cutting or grinding tool, rotated as regards the screw cutting tool during the screw cutting or grinding operations, and when the work is completed, the article acted on rapidly withdrawn from its relation with the screw cutting or grinding tool. Further, a construction by reason of which the attachment may be readily adjusted to cut threads of different pitch or threads upon an angular surface instead of a plain surface, etc.—an attachment embodying various details of construction, all of which will be specifically pointed out in the specification and set forth in the claims.

The accompanying drawings will serve to illustrate my invention, in which:

Fig. 1 is a plan view with the housing for the work-holding device in horizontal section, showing an arrangement of parts adapted for cutting left hand threads on the exterior of a cylindrical body.

Fig. 2 is a partial view, corresponding to a portion of Fig. 1, and intended to illustrate the forward movement of the article acted on across the screw cutting tool during the operation of screw cutting.

Fig. 3 is a partial view, showing the employment of a screw cutting tool with an angular face instead of a straight face, and adapted to cut a taper left hand thread.

Fig. 4 is a partial plan view in horizontal section, and is intended to illustrate a cutting tool and mechanism for advancing the article acted on, both having a different pitch of left hand thread from that shown in Figs. 1 and 2.

Fig. 5 is a plan and partial section of the mechanism situated at the left of Fig. 1, and intended to illustrate the means employed to adjust the work and the holding device for the work along the base of the attachment.

Fig. 6 is a vertical section taken on the line VI—VI of Fig. 1.

Fig. 7 is a vertical section corresponding to Fig. 6, but illustrating the casing which carries the work adjusted along the base of the attachment, and the relation of the several parts when a screw cutting tool is cutting a thread on the interior of a tubular body.

Fig. 8 is a side elevation of the attachment.

Fig. 9 is a section taken along the line IX—IX of Fig. 6.

Fig. 10 is a section on the line X—X of Fig. 6.

Fig. 11 is a partial plan view in horizontal section, showing the arrangement of parts adapted for cutting right hand threads on the exterior of a cylindrical body.

Referring to the drawings: 10 indicates the base of the attachment, which supports the operative parts of the machine. The base is shown in the drawings, as provided with an extension 11 cast integrally with the base. The extension 11 may, however, form a part of a milling or grinding machine, in which case, such extension 11 is independent of the base 10. The top of the base has formed on its surface, a longitudinal slot 12, the side faces of which are inclined from the top downwardly and outwardly, as indicated at 13. Mounted in bearings 14 on the extension 11, is a shaft 15, on which is a pulley wheel 16 adapted to be driven in the direction indicated by the arrow (Fig. 1) by means of a belt or other power transmitting mechanism. Mounted on one end of the shaft 15, is a cutter 17. This cutter may be of any suitable known construction, or in place of a cutter, a grinding wheel may be employed.

In Figs. 1, 2 and 8, the cutter is shown as having four parallel rows of teeth; in Fig. 4, three parallel rows; in Fig. 3, four parallel rows, with the face of the cutter disposed at an angle. The number of rows of teeth for cutting exterior or interior straight or tapered threads, will manifestly be in accordance with the pitch of the thread it is desired to cut.

Mounted on the top of the base 10 is a plate 18, having a depending portion 19, the side faces of which are inclined downwardly and outwardly, and adapted for engagement with the inclined faces 13 of the slot 12 of the base. The plate 18 is adapted to be given a longitudinal motion along the base 10 for the purpose of bringing the article acted on into relation with the cutter or grinding tool. The motion forward or backward, is effected by means of a hand lever 21, secured to a transverse rod 22, pivotally mounted in bearings 23, which bearings form part of a slide which is adjustable in slot 12 of base 10, through the instrumentality of a set screw and nut 24. Pivotally connected to the lever 21 at its bottom, is a link 25 (see Figs. 1 and 8) pivotally connected at its opposite end to a pin 26 located in an opening 27 in one side of the plate 18. Interposed between the side of the plate 18 and the head of the pin 26, is a spring 28. It will be understood that the bearing of the lever 21 can be fixed in any desired position in the slot 12, and that by moving the lever 21, the plate 18 can be adjusted longitudinally along the base 10. Thus the article to be acted on may be brought into relation with the cutter, i. e., into the position shown in Figs. 1 and 8, or rapidly withdrawn from the cutter when the work is finished, as will be more fully hereafter explained. By reason of the spring 28, the pressure exerted upon the plate 18 will be an elastic pressure, which is a necessary condition to prevent undue friction when the cutting or grinding tool commences its operation upon the article acted on.

Situated at the opposite side of the plate 18, is an adjusting screw 29, mounted in a bearing 30 on base 10, by reason of which the limit of the forward movement of the plate 18 along the base 10 may be determined. 31 indicates a pin located in a slot in pin 26, which permits movement of the pin 26 in the opening 27 of the plate 18, and connects the plate to the pin, so that the plate may be drawn backward away from the article acted on, when the movement of the lever 21 is reversed. The top of the plate 18 is provided with a slot or opening 32 which extends at a right angle to the slot 12 of base 10. The slot 32 is provided with inclined faces (see Figs. 8 and 10) and mounted in this slot is a casing 33 having a depending portion 34 with inclined faces, which cooperate with the inclined faces of the slot 32. To define the limit of movement of the casing 33 and its contained parts along the slot 32 of plate 18, in one direction, a screw 35 mounted in threaded bearing 36, is provided. The end of the screw bears against the end of the casing 33, but is not connected to it. On the end of the screw is a hand wheel 37 and a jam nut 38. To provide for movement of the casing 33, its contained parts, and the article to be acted upon, along the slot 32 of plate 18, there is a handle and link arrangement 39, similar in all respects to that shown at 21. The purpose of providing for adjustment of the casing 33 is to adjust the relation of the article acted on to the cutter or grinder. In Fig. 6, the cutter is shown acting upon the outside of the tubular body, on which a thread is to be cut, and in Fig. 7, upon the inside of such tubular body. Where the cutting tool is to operate on the outside of an article, the casing is adjusted along the slot 32 of plate 18, so as to bring the article acted on into operative relation with the face of the cutter, as shown in Figs. 1 and 6. Where the cutting tool is to operate on the inside of the article as shown in Fig. 7, the plate 18, through the lever 21, is moved along the slot 12 of base 10, thereby moving the article acted on longitudinally of its axis, so that the faces of the article acted on and of the cutting tool are moved out of operative relation, with their longitudinal axes in different parallel planes. The casing is then adjusted along slot 32 of the plate 18, by means of the lever 39, to make the axis of the article to be acted on and that of the cutter, coincident. The plate 18 and casing 33 is then again adjusted along the base 10, through the lever 21 to place the cutting tool within the cavity of the article to be acted on, and then the casing and work again adjusted along slot 32 of plate 18 by lever 39, to displace the axis of the article relative to that of the cutter, as illustrated in Fig. 7. Where the cutting tool is to operate on the outside of a cylindrical piece of work on which a right hand thread is to be cut (see Fig. 11) the plate 18, through the lever 21, is moved along the longitudinal slot 12 of base 10, thereby moving the work longitudinally of its axis so that the work is free from the cutter. The casing is then adjusted along slot 32 of plate 18, by means of the lever 39, so as to bring the longitudinal axis of the work in a plane parallel with the cutter, but on the side opposite to that shown in Fig. 6. The casing 33 is then adjusted along the base 10, through the lever 21, to place the work in range with the face of the cutting tool, and then the casing is adjusted along the slot 32 of plate 18, so as to bring the work into operative relation with the face of the cutter, as illustrated in Fig. 11.

What is true of the cutter, is also true of the grinder, when a grinder is used in place of a cutter.

Situated in the upper portion of the casing 33 and transversely of the casing, is a split tube 40 adapted to hold the article A to be acted on. The right hand outer periphery of this tube has an inclined face 41. The tube 40 is mounted in a sleeve 42, the right hand end of which has an inclined face 43 which corresponds to the inclined face 41 on the right hand end of the split tube 40. The inner end of the split tube 40 is provided with a screw thread 44, over which is a collar 45, having a screw thread 46. Connected to the collar and exterior to the casing, is a handle 47. By rotating this handle in one direction, the collar 45 will advance along the screw thread 44 on the left hand end of the sleeve 42, and will draw the split tube 40 within the sleeve, thus compressing the sleeve at its outer end and causing it to grip the article A to be acted on.

Located between a shoulder 48 on the split tube 40, and a shoulder 49 on the sleeve 42, is a spring 50 which serves, by exerting tension when the handle 47 is moved in one direction, to move the split tube to the right and release the work A. Mounted on the left hand end of the sleeve 42 is a ring 51 having an exterior screw thread 52. Located over this ring and secured in an opening in the casing, is a ring 53 having an interior screw thread 54, the screw threads 52 and 54 adapted to coact. The rings 51 and 53 are so constructed, that normally a space 55 will exist between them, the width of this space corresponding to the distance which the article to be acted on must move across the face of the cutting tool in a longitudinal direction (Fig. 1) to insure a complete thread being cut across the article to be acted on, as will be more fully described. The rings 51 and 53 are removable. The pitch of the threads 52—54 determine the pitch of the thread to be cut on article A. Thus by substituting other rings 51—53 with different pitch of threads, the threads cut on article A will likewise be changed, as desired.

Mounted on and secured to the sleeve 42, is a gear 56, which is in mesh with a sliding gear 57 in engagement with a spline 58 on shaft 59 in bearing 60 of the casing. Gear 57 has a tubular extension 61, provided with a knob 62 secured to its outer end, which extension is free to slide and rotate in a bearing 63 of the casing. Between the gear 57 and the bearing 63 is a spring 64 which normally acts to force the gear 57 into engagement with gear 56. Secured to shaft 59 is a beveled gear 65. Cooperating with the beveled gear wheel 65, is a bevel pinion 66 mounted on shaft 67, located in bearing 68 on the outside of the casing. Connected to this pinion, is a crank arm 69. By rotating the arm 69 in one direction, motion will be imparted to the gear 57, and through this gear to the large gear 56, and through it to the sleeve 42, ring 51 and article A to be acted on. This motion is a circular motion and rotates the face of the article to be acted on in a direction opposite to that of the face of the cutter, as indicated by the arrow on the work in Fig. 1, at the same time advancing the work across the cutter, by reason of the cooperative action of the screw threads on the rings 51 and 53. The space 55 between rings 51 and 53 corresponds in width to the distance which the article acted on must move across the cutter. By changing the cutter to one having an angular face, as shown in Fig. 3, a taper thread may be cut on the work, the pitch of the threads on rings 51 and 53 remaining the same. It has heretofore been stated that the pitch of the cutter may be altered as illustrated in Fig. 4. It will be obvious, that if the pitch of the cutter is altered, the pitch of the threads on the rings 51 and 53 must correspondingly be altered. Thus a different screw thread may be cut, first by changing the cutter, and second, by changing the rings 51 and 53. Both changes may be readily made and thus the adjustability of the attachment be such as to cover a wide range of work. In Fig. 11 is shown the arrangement of screw threads of the cutter and of the rings 51 and 53 which is required for cutting right hand threads on the work.

The movement of the crank arm 69 is necessarily slow to produce the circular movement of the article acted on, as the thread is cut. As soon as the thread is cut, it is desirable that the article acted on shall be immediately released and withdrawn from the cutter, and this can be accomplished by rotating the handle 47, which moves the sleeve in a direction opposite to that imparted by the crank arm 69, the parts by this movement changing from the position shown in Fig. 2 to that shown in Fig. 9. The large gear 56 at such time will be made free to rotate by movement of the small gear 57 out of mesh therewith, through the agency of the hand operated knob 62, thereby permitting the mechanism connecting small gear 57 to crank 69 to stand still.

It will be understood that the reverse movement of the handle 47 will be transmitted through the split tube 40 to the sleeve 42 and threaded ring 51, which thread 52, by engagement with the thread 54, will cause movement in a right hand direction, of the parts, to bring them into the position shown in Fig. 9.

The operation of the device is as follows: Referring first to Fig. 1. The cutter 17 is rotated in the direction of the arrow; the article to be acted on is adjusted as described, in relation to the cutter. As soon as the cutter has effected the required depth of cut on the article acted on, the crank arm 69 is rotated in one direction, which causes the article acted on to move across the face of the cutter, thereby producing a cut thread. When the thread is cut, the lever 39 is shifted, which draws the article acted on away from the cutter in a direction transversely of the base, small gear 57 is moved out of mesh with the large gear 56, and the handle 47 then shifted to bring the article acted on back to its original position, i. e., the position shown in Fig 9.

Referring to Fig 7. Where the cutter cuts an interior thread, the parts are adjusted as hereinbefore described, the operation of the cutter on the interior of the tube being the same as the operation of the cutter on the exterior of the article acted on, as also described. It will be understood that in cutting an exterior or interior thread, or in grinding, the tool is held to the work by the elastic pressure of the spring 28 working in connection with the handle 39 acting transversely along the base.

Having thus described my invention, I claim:

1. An attachment for milling or grinding machines, comprising a base, a cutting or grinding tool mounted on the base, a casing for the article to be acted on, a plate mounted on the base and carrying the casing, means for moving the plate and casing thereon longitudinally of the base, means for moving the casing transversely along the plate, means for imparting a slow rotary movement to the article acted on in one direction, and means for imparting a quick rotary movement to the article acted on in the opposite direction.

2. An attachment for milling or grinding machines, comprising a base, a cutting or grinding tool mounted on the base and adapted to receive rotary movement, a casing for the article to be acted on, a plate mounted on the base and carrying the casing, a lever device for moving the plate, the casing thereon and the article acted on longitudinally of the base toward the tool, a lever device for moving the casing and article acted on transversely along the plate toward the tool, a handle and interposed gear for imparting a slow rotary movement of the article acted on in one direction relative to the tool, and a lever and interposed mechanism for imparting a quick rotary movement to the article acted on in the opposite direction relative to the tool.

3. An attachment for milling and grinding machines, comprising a base, a tool mounted upon said base and capable of rotary movement, a casing for holding the article to be acted on, a plate mounted on the base and carrying the casing, means for moving the plate, casing and article acted on toward the tool longitudinally of the base, means for limiting the forward movement of said plate, means for moving the casing transversely along the plate relative to the tool, means for limiting said movement, means for holding the article acted on in the casing, means for imparting a slow rotary movement of the holding device for the article acted on in one direction relative to the tool, and means for imparting a quick rotary movement to the holding device for the article acted on in the opposite direction relative to the tool.

4. An attachment for milling and grinding machines comprising a base, a cutting or grading tool mounted on the base, a casing for the article to be acted on, a plate mounted on the base and carrying the casing, means for moving the plate and casing longitudinally of the base, means for moving the casing transversely along the plate, means for imparting a slow rotary movement to the article acted on in one direction, and means for instantaneously separating the article acted on from the cutting or grinding tool, without imparting rotary motion thereto.

In testimony whereof, I affix my signature in the presence of two witnesses.

ANTHONY C. P. RUSSEN.

Witnesses:
R. WOODHOUSE, Jr.,
F. M. DAVIS, Jr.